United States Patent Office 3,195,726
Patented July 20, 1965

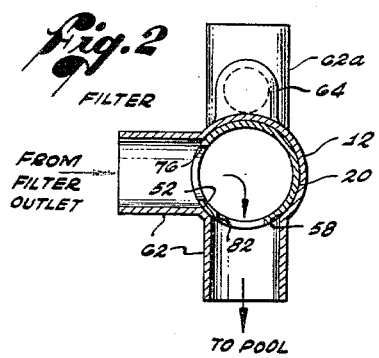
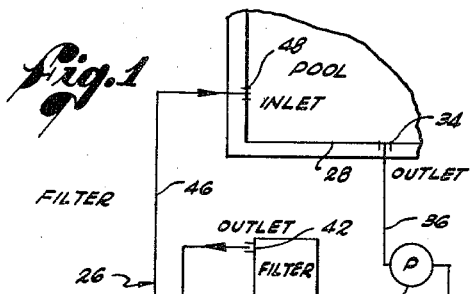
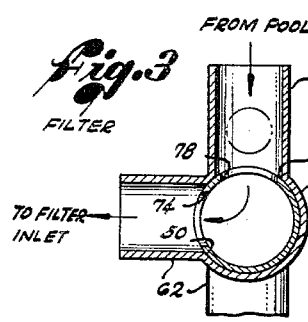
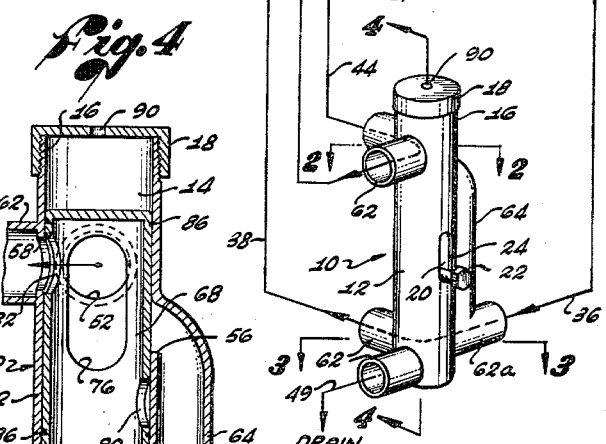
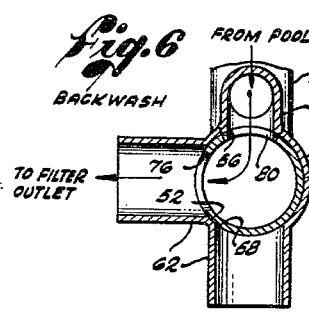
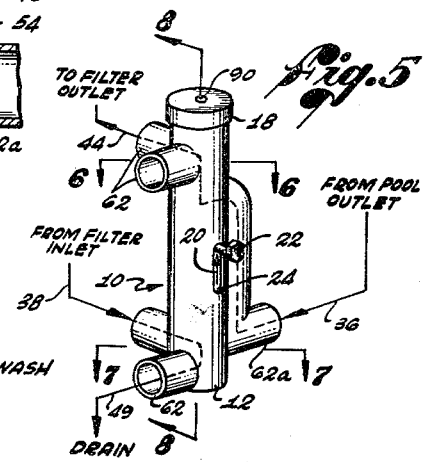
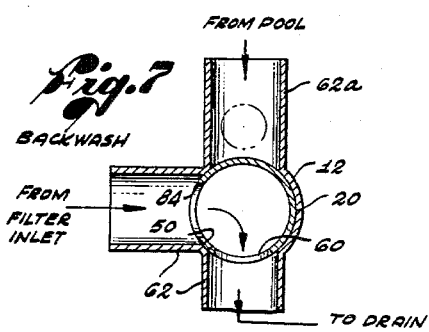

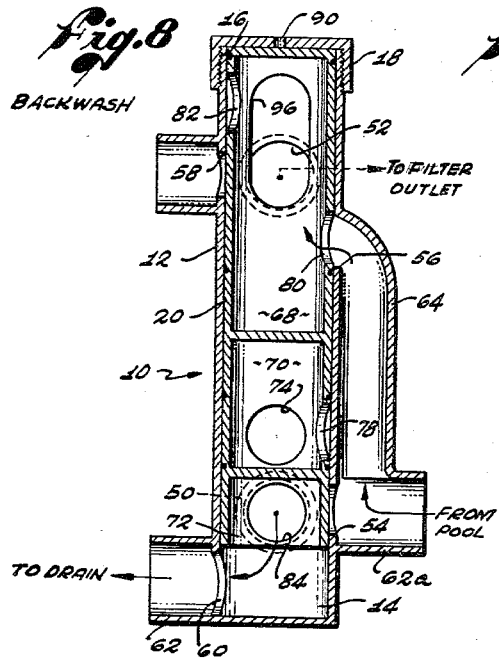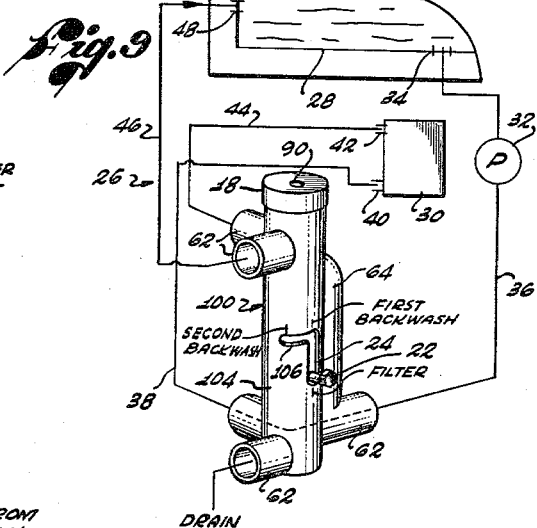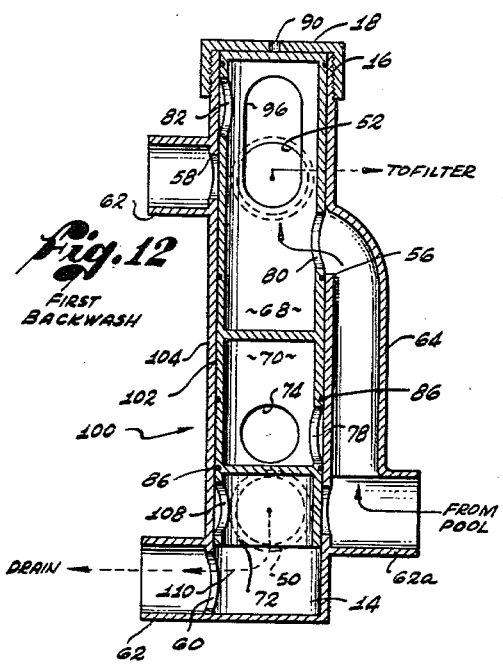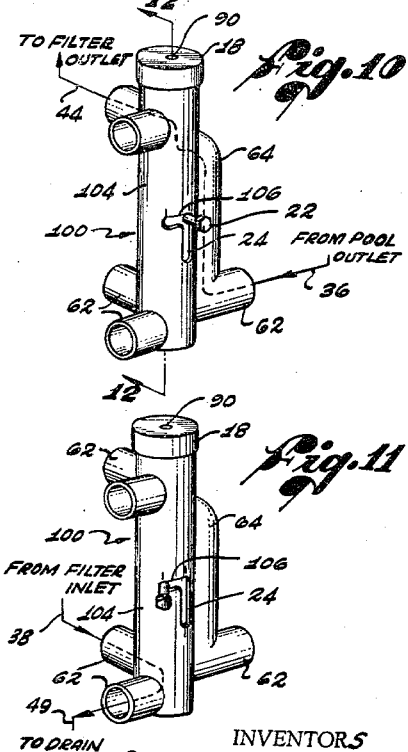

3,195,726
CONTROL VALVE MEANS FOR SWIMMING POOL FILTER AND BACKWASH OPERATIONS
Phillip E. Saurenman and Paul J. Saurenman, Pasadena, Calif., assignors, by mesne assignments, to Saurenman Co., Inc., South El Monte, Calif., a corporation of California
Filed June 18, 1962, Ser. No. 203,048
8 Claims. (Cl. 210—169)

This invention relates to swimming pool filtering systems, and more particularly to a valve for use in conjunction with such a system.

Swimming pools are constantly plagued with the problem of debris, such as dust, leaves, and insects falling into the water. Such debris is objectionable, of course, because it can be deposited on the walls of the pool and contaminate the water and constitute a health hazard for swimmers. To remove the debris, pools are commonly provided with filtering systems which include, in general, a filter and a pump interconnected and connected to the pool by a suitable conduit system. In normal filter operation, the debris laden water is withdrawn from the pool, circulated through the filter for removal of the debris and then delivered back into the pool.

After prolonged periods of use, it is necessary to clean the filter in order to maintain it operating efficiently. Cleaning is normally accomplished by "backwashing" which, as the term implies, involves pumping water from the pool through the filter in the reverse of the normal direction. To preclude the contaminated backwash water from being pumped back into the pool, the return line from the filter outlet to the pool is closed off, and a drain line from the filter is opened in order to enable this water to be delivered to the sewer system or other appropriate disposal means.

There are two basic methods for accomplishing backwashing. In one method, water is continually circulated through the filter in the reverse of the normal direction and then out through the drain conduit. For convenience, this method is referred to herein as the circulation method. The other method involves pumping water from the pool into the filter through its outlet, with the drain line temporarily closed off, whereby air is trapped within the filter, and a pressure head builds up. When this head reaches a predetermined level, the supply of pool water to the filter is closed off, and the drain line is opened, to allow the sudden surge of pressure to force out any accumulated debris. This latter method is referred to as the surge method.

An important operating characteristic of a filter system of the subject system is that during backwashing, the backwash water flowing from the filter must not pass through the pump. As will be appreciated, this debris is highly concentrated, particularly at the start of the operation and, therefore, if it were permitted to pass through the pump, it would be likely to permanently damage it.

In prior filtering systems, shifting between normal filtering and backwashing operations is effected through separate valves located in a number of the lines leading to and from the filter. The valves are individually opened and closed by the user in a predetermined sequence in shifting from one mode of filter operation to the other. Not only are these manual operations time consuming, but care must be exercised in carrying them out in the required sequence to avoid damaging the pump and contamination of the water in the pool.

It is an object of this invention to provide an improved valve control means for use in conjunction with a swimming pool filtering system, and which utilizes only a single control member to shift the filter between normal filtering and backwashing operations.

Another object is to provide valve means which obviates the necessity of incorporating a plurality of valves in a swimming pool filtering system in order to render it capable of both normal filtering operation and backwashing operation in the desired manner.

It is a further object to provide a valve system for pool filters with which the mode of operation of a filter can be changed in a minimum of time and with a minimum of manual operations.

Still another object of this invention is to provide a valve of the type described which is durable and reliable in operation, yet which is simple in construction and, hence, inexpensive to manufacture.

These and other objects, features, and advantages of the invention will be better understood by referring to the following description taken in conjunction with the accompanying drawings of illustrative embodiments thereof, in which:

FIGURE 1 is a perspective view of one form of the valve means of the invention, constructed and arranged for directing flow to backwash the filter in the circulation method, showing schematically the connections in a typical filtering system, the valve having its slidable plunger or piston positioned in this figure for normal filtering operation;

FIGURE 2 is a horizontal sectional view taken along the line 2—2 of FIGURE 1, showing the slidable plunger or piston positioned to effect direct communication between couplings to the filter outlet and pool inlet conduits;

FIGURE 3 is a horizontal sectional view taken along the line 3—3 of FIGURE 1, showing the plunger positioned to provide direct communication between the couplings to the pool outlet and filter inlet conduits;

FIGURE 4 is a vertical section taken on the line 4—4 of FIGURE 1, showing the plunger positioned as in FIGURES 2 and 3, for normal filtering operation;

FIGURE 5 is a perspective view, similar to FIGURE 1, except that the slidable member is positioned for backwashing;

FIGURE 6 is a horizontal sectional view taken along the line 6—6 of FIGURE 5, showing the plunger positioned to effect direct communication between couplings to the filter outlet and pool outlet conduits;

FIGURE 7 is a horizontal section taken along the line 7—7 of FIGURE 5, showing the plunger positioned to effect direct communication between the couplings to the filter inlet and drain conduits;

FIGURE 8 is a vertical section taken along the line 8—8 of FIGURE 5, showing the plunger positioned, as in FIGURES 6 and 7, for backwashing operation;

FIGURE 9 is a perspective view, similar to FIGURE 1, of a form of the valve of the invention for use in backwashing in the surge method, the valve having its slidable member positioned in this figure for normal filtering operation;

FIGURE 10 is a view similar to FIGURE 9, but illustrating the slidable member of the valve in a first backwash position;

FIGURE 11 is a view similar to FIGURES 9 and 10, but illustrating the slidable member of the valve in a second backwash position; and FIGURE 12 is a vertical section taken on the line 12—12 of FIGURE 10, showing the plunger positioned to effect direct communication between couplings to the pool outlet and filter outlet.

Referring to FIGURES 1 and 4, a valve structure 10 is shown, which includes a housing or body 12 formed with an internal chamber 14 which is open at the upper end 16, that end being closed by a removable cap 18. Slidably mounted within the chamber 14 for movement between a lower filter position and an upper backwash position is a plunger 20, which is constructed and arranged to cooperate in those positions with ports formed in the chamber wall to achieve valving in the desired manner. It will be understood that terms such as "upper" and "lower" are used herein only for convenience of description, and that the valve is adapted to operate effectively in other orientations.

In order to facilitate movement of the plunger 20 between its operating positions, an operating member 22 is secured to the periphery of the plunger at a location approximately midway between its ends. As illustrated in FIGURES 1 and 5, the member 22 projects radially outwardly through a slot 24 in the body 12, so as to be accessible from the exterior.

The valve 10 is illustrated in FIGURE 1 as installed in a filtering system 26 of a pool 28. The system 26 may be seen to include a filter 30 and a pump 32 connected in series by a suitable conduit system to the pool and to each other through the valve 10. It is believed that with the above description of the basic elements of the valve 10 in mind, as well as the components of the filtering system, the invention can be best understood by tracing the flow path through the system during both filtering and backwashing operations with particular attention being given to the function of the valve 10. When the valve 10 is positioned for filtering operation, as in FIGURE 1, debris laden water is withdrawn from the outlet 34 of the pool through a conduit 36 by the pump 32. The conduit 36 leads from the pump to the valve 10 where flow is directed to a conduit 38 connected to the filter inlet 40. Circulation next takes place through the filter 30 for the purpose of removing debris, with flow from the filter outlet 42 being through a conduit 44 leading back to the valve 10. Continuing, flow of the filtered water is finally directed by the valve back to the pool through a return conduit 46 connected to the pool inlet 48.

The filtering system 26 is operable in the above manner, until a substantial amount of debris accumulates in the filter 30. At that time, the valve 10 is shifted to its backwash position by moving a control member 22 from the position of FIGURE 1 to that of FIGURE 5. Water from the pool now passes through the valve 10 to the filter outlet 42, as indicated by arrows in FIGURE 5. This causes flow to take place through the filter 30 in the reverse of the normal direction. Accordingly, any accumulated debris is washed back out through the filter inlet 40 and back to the valve 10. In this operating position, the valve 10 directs the backwash flow to a drain conduit 49, which is connected to the sewer system or other appropriate disposal means (not shown). It is important to note that the backwash water carrying the concentrated debris does not pass through the pump.

Backwashing in this manner continues until the circulated water passing out of the filter 30 is fairly clean. When this condition has been achieved, then the valve is, of course, shifted back to its position of FIGURE 1 to effect normal filtering operation.

In the presently preferred embodiment of the valve, the body 12 is cylindrical in shape, as is its axial internal chamber 14. As noted above, a plurality of ports are formed in the chamber wall. These include (see FIGURES 2-4) a first port 50 located adjacent the lower end of the chamber 14 and adapted for connection to the conduit 38 leading to the filter inlet 40. A second port 52 angularly aligned with the first port 50 and longitudinally spaced toward the upper end 16 of the chamber 14 is adapted for connection to the conduit 44 leading from the filter outlet 42. A third port 54 is angularly spaced approximately 90° from the first port 50 and circumferentially aligned or in a common transverse plane therewith. Spaced just slightly below the second port 52 and angularly aligned with the third port 54 is a fourth port 56. Both the third and fourth ports 54 and 56 are adapted for connection with the conduit 36 leading from the pool outlet 34. A fifth port 58 is circumferentially aligned with the second port 52 and extends oppositely from the third and fourth ports 54 and 56 at approximately a right angle to the second port 52. This last mentioned port is adapted for connection with the conduit 46 leading to the pool inlet 48. Finally, a sixth port 60 is spaced below all of the above mentioned ports immediately adjacent the lower end of the chamber 14. This port 60 is angularly aligned with the fifth port 58 and adapted for connection to the drain conduit 49. To simplify the description, these various parts are identified below by the part of the filter system or pool to which they are connected, e.g. the sixth port 60 is referred to as the "drain" port.

To facilitate connection of the valve 10 in the filtering system 26, the body 14 is preferably provided with a plurality of cylindrical couplings 62 in registry with the ports. With the exception of the case of the upper pool outlet port 56, the couplings 62 are shown to extend radially outwardly a short distance.

Since both ports 54 and 56 are adapted for connection to the pool outlet 34, it is desirable to interconnect them at the valve, so as to simplify the necessary conduit system. This is achieved in the illustrative case by forming the body 12 with an elbow 64 joined at one end to the upper pool outlet port 56 and at the other end to the coupling 62a extending from the lower pool outlet port 54, as illustrated in FIGURE 4.

The plunger 20 is cylindrical in shape and is received in a close sliding fit in the chamber 14. Passageways are provided through the plunger, so as to permit fluid passage through the chamber 14 to the various ports when the plunger is in a given one of its positions. In the present case, this is achieved by providing the plunger with a hollow interior divided into three compartments with apertured walls, namely, an upper compartment 68, an intermediate compartment 70, and a lower compartment 72. The upper and intermediate compartments 68 and 70, respectively, are closed at their ends, whereas the lower compartment 72 is open at its lower end. When the plunger is in one or the other of its operating positions, the apertures provided in the wall of the plunger are adapted to register with predetermined ports in the chamber wall, while blocking off the remaining ports.

The apertures include a first aperture 74 in the wall of the intermediate compartment 70 adapted to register in the filter position of the plunger 20 with the filter inlet port 50. A second elongated aperture 76 in the upper compartment is angularly aligned with the first aperture 74 and adapted to register with the filter outlet port 52, when the plunger 20 is in either of its operating positions. In similar regard, a third aperture 78 in the compartment 70 at a location circumferentially aligned with, and angularly spaced from, the first aperture 74 is adapted to register in the filter position with the lower pool outlet port 54 in the chamber wall. At a location in the upper plunger compartment 68 below the second aperture 76 and at angularly spacing therefrom is a fourth aperture 80 adapted for registery in the backwash position with the upper pool outlet port 56. Located adjacent the upper end of the upper compartment 68 at angular spacing from the second aperture 76 is a fifth aperture 82, which registers in the filter position of the plunger 20 with the pool inlet port 58. Finally, a sixth aperture 84 is provided in the portion of the plunger wall corresponding to the lower compartment 72 in angular alignment with the apertures 74 and 76 and arranged to register with the filter inlet port 50, when the plunger 20 is in its backwash position.

Both the body 14 and the plunger 20 are preferably formed by casting them of bronze. The shapes of these parts readily adapt them to casting, which is a desirable forming method from both the quality and economic standpoints. Bronze is a preferred material, as it is strong and resistant to corrosion, and possesses good casting properties.

Referring to FIGURE 4 where, as noted above, the plunger 20 is positioned for normal filtering operation, flow through the valve 10 takes place in the following manner. Fluid supplied from the pool 28 by the pump 32 passes in through the lower pool outlet port 54 and aperture 78, which are then in registry with one another, to the intermediate compartment 70 of the plunger 20. Flow continues (FIGURE 3) out of the compartment 70 through the registered aperture 74 and filter inlet port 50. The return flow from the filter 30 enters the upper compartment 68 through the filter outlet port 52 and aperture 76, and finally leaves that compartment through the aperture 82 and pool inlet port 58 (FIGURE 2) to return to the pool. In this position of the plunger 20, it may be seen in FIGURE 4 that the upper pool outlet port 56 and drain port 60 are blocked off by the wall of the plunger 20.

Shifting of the plunger to its backwash position, illustrated in FIGURES 5 through 8, is accomplished by simply moving the control member 22 upwardly. Movement of the plunger to the exact position is conveniently provided for by making the slot 24 just the correct extent, so that the member 22 rests in abutment with the opposite ends of the slot 24 in its operating positions. When the plunger 20 is in its backwash position, water from the pool passes through the elbow 64 and enters the upper compartment 68 of the plunger through the upper pool outlet port 56 and aperture 80, which are then in registry. In this case, flow continues out of the valve through the elongated aperture 76 and filter outlet port 52, passing through the filter 30 in the reverse of the normal direction. Backwash water from the filter 30 re-enters the valve through the filter inlet port 50 and aperture 84 in the lower plunger compartment 72. Referring to FIGURE 8, it may be seen that the lower compartment by virtue of being open at its lower end is in direct communication with the drain port 60. Thus, flow takes place through the lower compartment to the drain. In the backwash position, it may be seen that the wall of the plunger serves to block the lower pool outlet port 54 and the pool inlet port 58.

An important feature of the invention is that the drain port 60, as noted above, is located below all other parts and, in particular, the filter inlet port 52. Because of this, debris backwashed from the filter 30 flows through the valve chamber 14 not only under the influence of the backwash water, but also under the influence of gravity. Accordingly, there is virtually no chance of debris becoming trapped in the chamber and interfering with movement of the plunger.

For optimum efficiency of operation, sealing means 86 comprising a plurality of circumferential grooves and co-operating O-rings received therein are provided and longitudinally spaced positions on the plunger 20. The grooves and O-rings are located so as to prevent flow between the engaging surfaces of the plunger 20 and chamber 14 to the regions of the plunger corresponding to the three compartments 68, 70, and 72.

The cap 18 is preferably screwthreaded on the upper end 16 of the body, so as to be quickly and easily removable to obtain access to the plunger 20 for removing it for cleaning and the like. In this regard, the control member 22 is preferably threadedly engaged in a bore (not shown) in the plunger 20, so that it may be separated from the plunger in order to free the latter for removal. As shown in FIGURE 4, the cap 20 has a bleed passage 90 for venting the chamber 14 to the atmosphere.

A modified valve 100 constructed in accordance with the invention for backwashing by the surge method is illustrated in FIGURES 9 through 12. In this instance, the plunger 102 is movable relative to the body 104 between three operating positions, namely, a filter position, a first backwash position, and a second backwash position, illustrated in FIGURES 9, 10, and 11, respectively. The constructions of the two embodiments are essentially the same and, accordingly, in order to simplify the description, like parts are identified with the same numeral. The body 104 of the valve 100 differs from that of the former by having a horizontal slot 106 extending from the upper end of the slot 24. This enables the plunger 102 to be moved angularly with respect to the body 104 between first and second backwash positions. Similarly, the only difference in the plungers 20 and 102 of the two valves is that the sixth aperture 108 of the latter is angularly offset approximately 90° from alignment with the apertures 74 and 76, whereas in the former the sixth aperture 84 is in angular alignment with those apertures.

As noted above, the elements are constructed and arranged so that valving is accomplished in accordance with the requirements of the surge method. To this end, when the plunger 102 is in the filter position of FIGURE 9, flow through the valve 100 takes place in a manner identical to that described in conjunction with the valve 10.

Further, when the plunger 102 is moved to its first backwash position of FIGURES 10 and 12, flow from the pool outlet 34 is diverted through the chamber 14 by means of the passageway in the plunger 20 to the filter outlet 42, just as in the previous case. However, as distinguished from the former embodiment, the plunger 102 blocks the filter inlet port 50 and, hence, return flow from the filter 30. Accordingly, the pressure in the filter 30 rapidly builds up upon continued operation of the pump 32 by virtue of trapped air.

When this pressure has reached a predetermined level, the user moves the plunger 20 angularly to the second backwash position of FIGURE 11. This results in blocking the upper pool outlet port 56, and thereby terminates the supply of fluid to the filter 30. Simultaneously, the sixth aperture 108 is brought into registry with the filter inlet port 50 to provide communication through the valve to the drain port 60. Consequently, a surge of pressure from the filter 30 takes place, causing accumulated debris to be washed out, as indicated by the phantom line 110 in FIGURE 12.

It will readily be appreciated that the valve of the invention is effective upon movement of a single control member to shift the operation of a filtering system from normal filtering to backwashing by the desired method. Particular attention is directed to the fact that during backwashing, irrespective of whether the valve is constructed for backwashing in accordance with the circulation or surge method, no backwash water is passed through the pump and, accordingly, its useful life is prolonged.

Although certain embodiments of the invention have been illustrated and described with a certain degree of particularity, it will be understood that this was only by way of example and that various changes in the construction and arrangement of the various parts may be made without departing from the spirit and scope of the invention.

We claim:

1. In a swimming pool filtering system including a filter and a pump interconnected and connected to the pool by a conduit system, and a drain conduit connected to the filter for disposing of debris accumulated therein, a valve comprising:

a body formed with an internal chamber, said chamber being cylindrical in shape and having upper and lower ends; means on said body forming a plurality of ports in the chamber wall fluid connected, one each, to the filter inlet, filter outlet, pool outlet, pool inlet, and drain conduit said drain port being positioned in said chamber below said filter inlet port and immediately adjacent the lower end of said chamber;

a hollow, compartmented plunger divided into an upper, lower and intermediate compartments and slidably mounted in said chamber for longitudinal movement between filter and backwash positions; means connected to said plunger and accessible exteriorly of said body for moving said plunger between said positions;

and means on said plunger blocking in said filter position flow through said drain port, but establishing fluid communication through said chamber and said intermediate compartment between said pool outlet and filter inlet ports and through said chamber and said upper compartment between said filter outlet and pool inlet ports, and blocking in said backwash position flow through said pool inlet port, but establishing fluid communication through said chamber and said upper compartment between said pool outlet and filter outlet ports and through said chamber and said lower compartment between said filter inlet and drain ports.

2. In a swimming pool filtering system including a filter and a pump interconnected and connected to the pool by a conduit system, and a drain conduit connected to the filter for disposing of debris accumulated therein, a valve comprising:

a body formed with an internal chamber and having a plurality of spaced apart ports in the chamber wall including first and second ports fluid connected to the inlet and outlet, respectively, of the filter, third and fourth ports fluid connected to the pool outlet, a fifth port fluid connected to the pool inlet, and a sixth port fluid connected to the drain conduit;

a plunger slidably mounted in said chamber for movement between first and second operating positions;

and means on said plunger blocking in said first operating position said fourth and sixth ports, but permitting fluid passage through said chamber between said first and third ports and said second and fifth ports, and blocking in said second operating position said third and fifth ports, but permitting fluid passage through said chamber between said second and fourth ports and said first and sixth ports, the fluid passage between said second and fourth ports and said first and sixth ports being established prior to blocking of said second and fifth ports during movement of said plunger from its first to its second operating position and the fluid passage between said first and third ports and said second and fifth ports being established prior to blocking of said fourth and sixth ports during movement of said plunger from its second to its first operating position.

3. In a swimming pool filtering system including a filter and a pump interconnected and connected to the pool by a conduit system, and a drain conduit connected to the filter for disposing of debris accumulated therein, a valve comprising:

a body formed with an internal chamber and having a plurality of spaced apart ports in the chamber wall including first and second ports fluid connected to the inlet and outlet, respectively, of the filter, third and fourth ports fluid connected to the pool outlet, a fifth port fluid connected to the pool inlet, and a sixth port fluid connected to the drain conduit;

a plunger mounted in said chamber and movable between first, second, and third operating positions;

and means on said plunger blocking in said first operating position said fourth and sixth ports, but permitting fluid passage through said chamber between said first and third ports and said second and fifth ports, blocking in said second operating position said first, third, and fifth ports, but permitting fluid passage through said chamber between said second and fourth ports, and blocking in said third operating position said second, third, fourth, and fifth ports, but permitting fluid passage through said chamber between said first and sixth ports.

4. A valve comprising:

an elongated body formed with an internal chamber, said chamber being cylindrical in shape and having upper and lower ends;

means on said body forming a plurality of ports in the side wall of the chamber, said ports including a first port located adjacent the lower end of said chamber, a second port longitudinally spaced from said first port toward the upper end of said chamber, a third port circumferentially aligned with, and angularly spaced from, said first port, a fourth port longitudinally spaced between said first and second ports, said third and fourth ports being in constant communication, a fifth port circumferentially aligned with, and angularly spaced from, said second port, and a sixth port located below said aforementioned ports and adjacent to the lower end of said chamber;

a plunger slidably mounted in said chamber for longitudinal movement between filter and backwash positions;

and means on said plunger blocking in said filter position said fourth and sixth ports, but permitting flow through said chamber between said first and third ports and said second and fifth ports, and blocking in said backwash position said third and fifth ports, but permitting flow through said chamber between said second and fourth ports and said first and sixth ports.

5. The subject matter of claim 4, including means on said body and plunger for restraining them against relative rotational movement.

6. A valve comprising:

an elongated body formed with an internal chamber, said chamber being cylindrical in shape and having upper and lower ends;

means on said body forming a plurality of ports in the side wall of the chamber, said ports including a first port located adjacent the lower end of said chamber, a second port longitudinally spaced from said first port toward the upper end of said chamber, a third port circumferentially aligned with, and angularly spaced from, said first port, a fourth port longitudinally spaced between said first and second ports, said third and fourth ports being in constant communication, a fifth port circumferentially aligned with, and angularly spaced from, said second port, and a sixth port located below said aforementioned ports and adjacent the lower end of said chamber;

a plunger in said chamber and movable successively between filter, first backwash, and second backwash positions said plunger being movable longitudinally between said filter and first backwash positions and angularly between said first and second backwash positions;

and means on said plunger blocking in said filter position flow through said fourth port and said sixth port, but permitting flow through said chamber between said first and third ports and said second and fifth ports, blocking in said first backwash position flow through said first port, said third port, said fifth port, and said sixth port, but permitting flow through said chamber between said second and fourth ports, and blocking in said second backwash position said second port, said third port, said fourth port, and said fifth port, but permitting flow through said chamber between said first and sixth ports.

7. A value comprising:

an elongated body formed with an internal chamber having upper and lower ends;

means on said body forming a plurality of ports in the side wall of said chamber, said ports including a first port located adjacent the lower end of the chamber, a second port longitudinally spaced from said first port toward the upper end of said chamber, a third port circumferentially aligned with, and angularly spaced from, said first port, a fourth port longitudinally spaced between said first and second ports, a fifth port circumferentially aligned with, and angularly spaced from, said second port, and a sixth port located below said first port;

and a plunger slidably mounted in said chamber for longitudinal movement between filter and backwash positions, said plunger being formed with a hollow interior divided into an upper, a lower, and an intermediate compartment, there being a first aperture in the wall of said intermediate compartment adapted to register with said first port when said plunger is in its filter position, a second aperture in said upper compartment adapted to register with said second port when said plunger is in both its filter and backwash positions, a third aperture in said intermediate compartment adapted to register with said third port when said plunger is in its filter position, a fourth aperture in said upper compartment adapted to register with said fourth port when said plunger is in its backwash position, a fifth aperture in said upper compartment adapted to register with said fifth port when said plunger is in its filter position, and a sixth aperture in said lower compartment adapted to register with said first port when said plunger is in its backwash position.

8. The subject matter of claim 7 wherein said plunger is closed at its upper end and open at its lower end and embodies means to prevent fluid flow through the interior thereof between said compartments, and including means on said body and said plunger for preventing flow between their engaging surfaces.

References Cited by the Examiner
UNITED STATES PATENTS

| | | | |
|---|---|---|---|
| 268,971 | 12/82 | Abbott | 210—425 |
| 855,422 | 5/07 | Yearwood | 137—625.68 |
| 2,757,642 | 8/56 | Raney | 137—625.68 |
| 2,828,767 | 4/58 | Barusch | 137—625.68 |
| 2,902,157 | 9/59 | Culver | 210—169 |
| 3,007,492 | 11/61 | Grimmer | 137—625.48 X |
| 3,076,476 | 2/63 | Campbell | 137—625.68 |

REUBEN FRIEDMAN, *Primary Examiner.*

HERBERT L. MARTIN, *Examiner.*